Aug. 26, 1930. W. WUERFEL Re. 17,785

SPRING AND METHOD OF MAKING SAME

Original Filed Feb. 15, 1927

Inventor:

William Wuerfel,

By Leonard L. Kalish

Attorney

Reissued Aug. 26, 1930

Re. 17,785

UNITED STATES PATENT OFFICE

WILLIAM WUERFEL, OF PHILADELPHIA, PENNSYLVANIA, ASSIGNOR TO WILKENING MANUFACTURING CO., OF PHILADELPHIA, PENNSYLVANIA, A CORPORATION OF DELAWARE

SPRING AND METHOD OF MAKING SAME

Original No. 1,668,297, dated May 1, 1928, Serial No. 168,288, filed February 15, 1927. Application for reissue filed April 18, 1930. Serial No. 445,514.

My invention relates to a new and useful method of making springs, as well as novel apparatus for carrying out my method, and it relates more particularly to a novel method of making flat annular springs, having a series of alternatively reversed helical formations therein each of but a fraction of the circumference of the spring. My invention relates more particularly to the novel method of shaping springs of this type by means of the simultaneous application of a series of axial alternate forces uniformly distributed over annular spring blanks, said alternate forces being reversed in direction and staggered, and the application of heat to the spring blanks while the latter are distorted by said series of alternately opposed and staggered axial forces.

My invention further relates to annular springs of cast iron, adapted to be used more particularly in connection with laterally expansible piston rings for internal combustion engines.

With the above ends in view, my invention consists in forming relatively thin annular spring blanks of cast iron and of any desired radial width, by any suitable means, as by cutting or slicing the same from suitable tubular cast iron "pot" or cylinder of any desired wall thickness, simultaneously applying an alternate and staggered series of axial forces to one or a stack of such spring blanks, thereby to distort the same, as by clamping the same between two opposed discs or washers having suitable staggered projections thereon suitably spaced throughout the circumference of the spring blanks, and then applying heat of sufficient temperature to the rings, while thus distorted until the same have set, cooling the same and lastly splitting said rings.

For the purpose of illustrating my invention I have, in the accompanying drawings, shown a preferred form thereof, which is at present preferred by me since it will give in practice, satisfactory and reliable results, although it is to be understood that the various instrumentalities of which my invention consists can be variously arranged and organized and that my invention is not limited to the precise arrangement and organization of these instrumentalities as herein shown and described.

In the accompanying drawings, in which like reference characters indicate like parts, Figure 1 represents a front elevation of the novel apparatus adapted to carry out my novel method, and embodying my invention.

Figure 5:
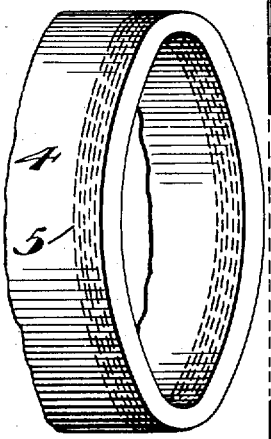
Figure 5 represents a fragmentary perspective view of a cast iron "pot" or cylinder blank from which the spring blanks are cut.
Figure 6:
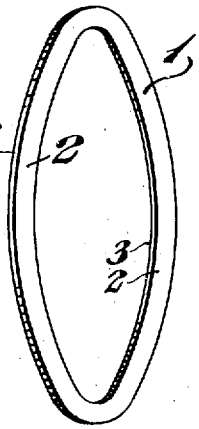
Figure 6 represents a perspective view of a spring blank.
Figure 2:
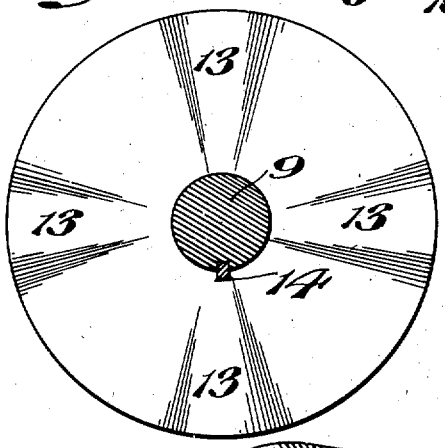
Figure 2 represents a top plan view of the upper clamping disc.

In carrying out my invention, I first form a series of spring blanks 1 of suitable thickness and radial width, having opposed faces 2 and 3 parallel to each other and disposed in plane surfaces. The ring blanks 1 are preferably of a suitable grade of cast iron and may be formed of uniform parallel cylindrical blanks or "pots" 4, of the desired wall thickness, by cutting or turning therefrom individual ring blanks 1, upon a lathe or the like, along the dotted line 5 (see Figure 5).

The apparatus employed in carrying out my invention comprises chiefly two opposed metallic discs 6 and 7 between which a stack 8 of spring blanks 1 may be clamped by any suitable means, such as the bolt 9 having its head 10 anchored in the lower disc 6, and having a nut 11 threaded onto the upper free ends thereof.

Each of the discs 6 and 7 is provided with a series of opposed projections 12 and 13 respectively which may be formed integrally therewith, or may be simply placed thereon in any suitable manner. The projections 12 and 13 are of a suitably slight height and of any desired contour and number, being equally spaced however, throughout the circumference. The projections 12 and 13 on the lower and upper discs 6 and 7 respectively are also in staggered relation to each other and may be maintained in such relation by any suitable means, as by the anchorage of the head 10 of the bolt 9 in the lower disc 6 and by suitably keying the upper disc 7 to the bolt 9, by means of the sliding key 14 or the like.

Figure 1:
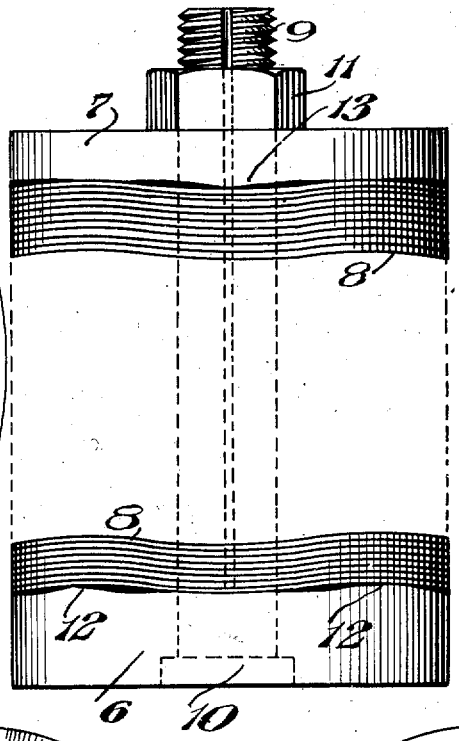
Figure 3:
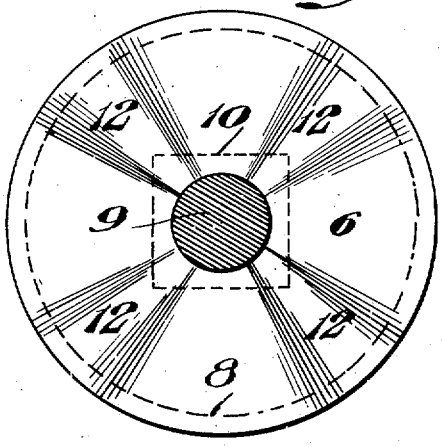
Figure 3 represents a top plan view of the lower clamping disc.
Figure 4:
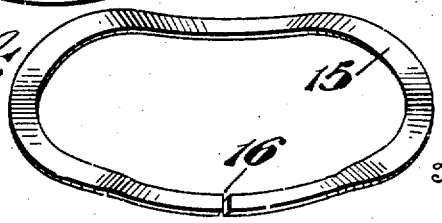
Figure 4 represents a perspective view of the finished product, made according to my invention.

The ring blanks 1 are stacked upon the lower disc 6 to any suitable height in alignment therewith and with each other, as shown in Figures 1 and 3, the upper disc 7 is then superimposed thereon, and lastly the nut 11 is threaded onto the bolt 9, so as to clamp the stack of rings 8 between the two discs 6 and 7. By thus clamping the stack of rings 8 between the two discs 6 and 7, having the opposed and staggered projections 12 and 13, on the juxtaposed clamping surfaces thereof, the spring blanks 1 are simultaneously subjected to a series of alternate, staggered, axial forces and will thereby be uniformly distorted into the general shape indicated in Figures 1 and 4, having successive and reversed helical formations therein, over suitable fractions of the circumference of the ring, depending on the number of projections 12 and 13 employed.

The stack of spring blanks thus clamped or distorted, is then subjected to a suitable temperature, for a sufficient length of time to permit a setting of the ring in the distorted condition or shape. The length of time required varies. The heat may be applied to the rings by any suitable means, such as by direct contact with a heated gas or heated liquid, although in the preferred embodiment of my invention, I immerse the distorted rings, together with the clamping device, into a suitable liquid bath of the desired temperature, so as to obtain a more uniform heating of the rings. After a subsequent cooling of the ring, to normal temperature, the clamping discs 6 and 7 are removed. The rings 1 will then be in the distorted shape or condition shown in Figure 4, thereby producing a spring indicated by the numeral 15, compressible transversely of the flat faces 2 and 3 thereof, that is, compressible parallel to the axis thereof. The completed springs are then split at a point 16, preferably at one of the several high points, that is, at the point of reversal of two successive helical formations, so as to form a discontinuous annulus which may be spread over the piston so as to be seated within the ring groove thereof.

It will now be apparent that I have devised a new and useful method of and apparatus for making springs, which embodies all the features of advantage enumerated as desirable in the statement of the invention and the above description, and while I have, in the present instance shown and described an embodiment thereof which is at present preferred by me, since it will give in practice satisfactory and reliable results, it is to be understood that such embodiment is susceptible of modification in various particulars without departing from the spirit or scope of the invention or sacrificing any of its advantages.

Having thus described my invention what I claim as new and desire to secure by Letters Patent is:—

1. The method of making springs of the character stated which consists in first simultaneously applying a series of distorting forces to an initially plain, parallel walled, and continuous annular cast iron ring parallel to the axis thereof, so as to form successive reversed helical convolutions therein, each of a fraction of the circumference of said ring, applying heat to said ring in the distorted condition thereof, of sufficient intensity and for a sufficient length of time to set the same in the distorted condition thereof, and lastly, severing at one point so as to break the continuity and to permit radial expansion thereof.

2. The method of making springs of the character stated, which consists in first distorting an initially plain, parallel-walled and continuous annular cast iron ring parallel to the axis thereof, so as to form successive reversed helical convolutions therein, each of a fraction of the circumference of said ring, and then applying heat to said ring in the distorted condition thereof, of sufficient intensity and for a sufficient length of time to set the same in the distorted condition thereof, and lastly, severing at one point so as to break the continuity and to permit radial expansion thereof.

In testimony whereof, I have hereunto set my hand and seal this first day of March, 1930.

WILLIAM WUERFEL.